United States Patent
Jiang et al.

(10) Patent No.: US 8,712,254 B2
(45) Date of Patent: Apr. 29, 2014

(54) ELECTRONIC DISPERSION COMPENSATION WITHIN OPTICAL COMMUNICATIONS USING RECONSTRUCTION

(75) Inventors: Hongtao Jiang, Irvine, CA (US); Kang Xiao, Irvine, CA (US); Jun Cao, Irvine, CA (US); Chung-Jue Chen, Irvine, CA (US); Zhongfeng Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 509 days.

(21) Appl. No.: 12/557,244

(22) Filed: Sep. 10, 2009

(65) Prior Publication Data

US 2011/0052216 A1    Mar. 3, 2011

Related U.S. Application Data

(60) Provisional application No. 61/237,579, filed on Aug. 27, 2009.

(51) Int. Cl.
*H04B 10/06* (2011.01)
*H03K 5/159* (2006.01)

(52) U.S. Cl.
USPC ............................ 398/208; 398/202; 375/233

(58) Field of Classification Search
USPC .................. 398/208, 202; 375/233
See application file for complete search history.

(56) References Cited

U.S. PATENT DOCUMENTS

| | | | |
|---|---|---|---|
| 2005/0025229 A1* | 2/2005 | Jones et al. | 375/232 |
| 2007/0133719 A1* | 6/2007 | Agazzi et al. | 375/341 |
| 2008/0101795 A1* | 5/2008 | Schulz et al. | 398/25 |

OTHER PUBLICATIONS

W. Kaiser, A. Ehrhardt, W. Rosenkranz, and N. Hanik, "Field trial of duobinary transmission over 1720 km at 10 Gbit/s," in Proc. Eur. Conf. Opt. Communication (ECOC'02), vol. 3, Copenhagen, Denmark, 2002, Paper p. 3.3.

(Continued)

*Primary Examiner* — Oommen Jacob
(74) *Attorney, Agent, or Firm* — Garlick & Markison; Kevin L. Smith

(57) ABSTRACT

Electronic dispersion compensation within optical communications using reconstruction. Within a communication system that includes any optical network portion, segment, or communication link, etc., that optical component/portion of the communication system is emulated within the electronic domain. For example, in a communication device having receiver functionality, deficiencies that may be incurred by the at least one optical portion of the communication system are compensated in the electronic domain of the communication device having the receiver functionality by employing reconstruction logic and/or circuitry therein. Multiple decision feedback equalizers (DFE) circuitries, implemented in the electronic domain, may be employed to provide feedback from different portions of the receiver functionality in accordance with performing compensation of optical incurred deficiencies (e.g., dispersion, non-linearity, inter-symbol interference (ISI), etc.). Within a communication device's receiver portion, equalization and compensation is performed in the electronic domain as adapted for high speed applications and higher order modulation schemes.

20 Claims, 11 Drawing Sheets

(56) References Cited

OTHER PUBLICATIONS

D. Penninckx, et al., "Optical Differential Phase Shift Keying (DPSK) and direct detection considered as a duobinary signal," Proc. 27th Eur. Conf, on Opt. Comm., pp. 456-457.

K. Yonenaga, S. Kuwano, "Dispersion-tolerant Optical Transmission System Using Duobinary Transmitter and Binary Receiver," Journal of Lightwave Technology, vol. 15, No. 8, 1997.

W. Kaiser, A. Ehrhardt, W. Rosenkranz, and N. Hanik, "Field trial of duobinary transmission over 1720 km at 10 Gbit/s," in Proc. Eur. Conf. Opt. Communication (ECOC'02), vol. 3, Copenhagen, Denmark, 2002, Paper P3.3.

D. Penninckx, et al., "Optical Differential Phase Shift Keying (DPSK) and direct detection considered as a duobinary signal," Proc. 27th Eur. Conf, on Opt. Comm., pp. 456-457, 2001.

R. A Griffin and A. C. Carter, "Optical differential quadrature phaseshift key (oDQPSK) for high capacity optical transmission," in OFC 2002, A. Sawchuk, ed., vol. 70 of OSA Trends in Optical and Photonics, paper WX6.

J. H. Winters and R. D. Bitlin, "Electrical signal processing techniques in long-haul fiber-optical systems," IEEE Trans. Commun., vol. 38, No. 9, pp. 1439-1453, Sep. 1990.

G. David Forney, Jr., "Maximum-Likelihood Sequence Estimation of Digital Sequences in the Presence of Intersymbol Interference," IEEE Transactions on Information Theory, vol. IT-18, No. 3, May 1972, pp. 363-378.

O. E. Agazzi, et al., "A 90nm CMOS DSP MLSD Transceiver with Integrated AFE for Electronic Dispersion Compensation of Multimode Optical Fibers at 10Gb/s," IEEE Journal of Solid-State Circuits, vol. 43., No. 12, Dec. 2008, pp. 2939-2957.

Y. Konishi, et al., "True PRBS Transmission of DQPSK by Differential Precoder Employing Parallel Prefix Network," Proc. OFC'06, OThR3. (2006).

\* cited by examiner

United States Patent US 8,712,254 B2

ELECTRONIC DISPERSION COMPENSATION WITHIN OPTICAL COMMUNICATIONS USING RECONSTRUCTION

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:
1. U.S. Provisional Application Ser. No. 61/237,579, entitled "Electronic dispersion compensation within optical communications using reconstruction," filed Aug. 27, 2009, now expired.

INCORPORATION BY REFERENCE

The following U.S. Utility Patent Application is hereby incorporated herein by reference in its entirety and is made part of the present U.S. Utility Patent Application for all purposes:
1. U.S. Utility patent application Ser. No. 11/837,278, entitled "Electronic dispersion compensation utilizing interleaved architecture and channel identification for assisting timing recovery," filed Aug. 10, 2007, now issued as U.S. Pat. No. 7,961,781, on Jun. 14, 2011, which claims priority pursuant to 35 U.S.C. §119(e) to the following U.S. Provisional Patent Application which is hereby incorporated herein by reference in its entirety and made part of the present U.S. Utility Patent Application for all purposes:
a. U.S. Provisional Application Ser. No. 60/840,123, filed Aug. 25, 2006, now expired.

BACKGROUND OF THE INVENTION

1. Technical Field of the Invention

The invention relates generally to optical communication systems; and, more particularly, it relates to performing electronic compensation for effects incurred by optical components within a communication system.

2. Description of Related Art

Data communication systems have been under continual development for many years. Certain communication systems include at least one optical network portion, segment, or communication link, etc. therein. In such communication systems that include such an optical portion thereof, such optical components therein may introduce certain deleterious effects which may generally be referred to as optical incurred deficiencies (e.g., dispersion, non-linearity, inter-symbol interference (ISI), etc.).

In addition, as various manufacturers of components move to provision communication devices that operate using higher data rates (bit rates) as well as more advanced modulation types (e.g., duobinary, differential phase shift keying (DSPK), differential quadrature phase shift keying (DQSPK), etc.), the magnitude of such optical incurred deficiencies necessarily can become exacerbated, and the overall effectiveness and operation of the communication system can suffer.

Within the prior art, the current means by which equalization is being performed simply cannot scale adequately with such higher data rates (bit rates) and more advanced modulation types. There exists a need in the art for a more effective means to deal with and compensate for such optical incurred deficiencies within such a communication system that includes at least one optical portion.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
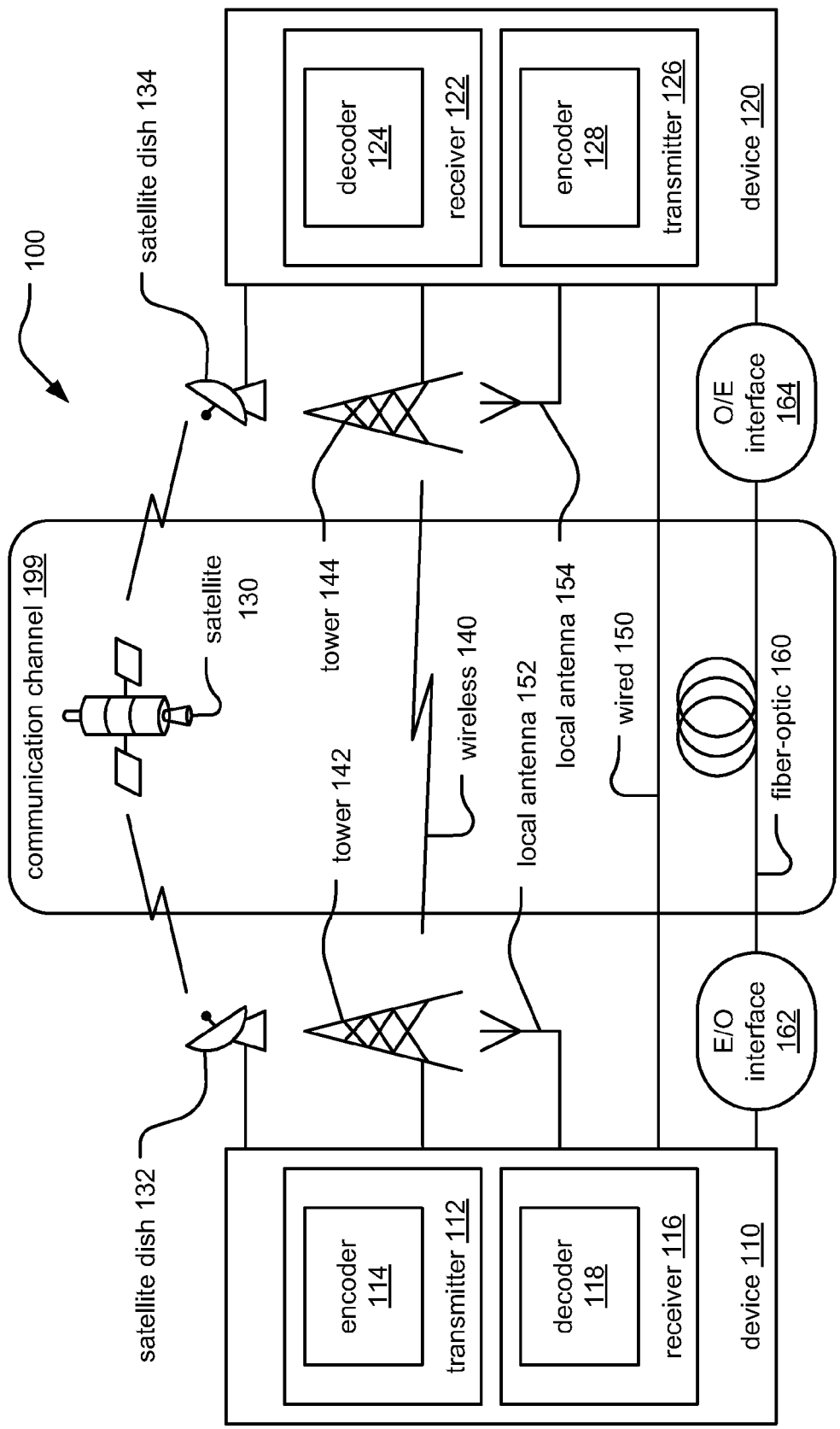
FIG. 1 and FIG. 2 illustrate various embodiments of communication systems.

The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well. Certain types of communication systems may also include various network segments, communication links, etc. composed of various types of media. For example, a communication system may include a satellite network segment, a wired network segment, a wireless network segment, and an optical network segment. Various embodiments of a communication system may include at least one optical network segment (e.g., at least one optical communication link).

Within many types of communication systems (e.g., the telecommunications industry), there are efforts to move to higher and higher data rates (bit rates) and more advanced modulation types. For example, with respect to long range and long haul telecommunications, there are efforts in the industry to increase to bit rates to 40 Gbit/s, 100 Gbit/s, and even greater rates over very long distances (e.g., greater than 1000 km). In addition, there is movement in the industry to try to employ advanced modulation types such as duobinary, differential phase shift keying (DSPK), and differential quadrature phase shift keying (DQSPK).

Optical duobinary transmission (ODB) offers some benefits for communication systems employing bit rates of 10 Gbit/s and above including improved dispersion tolerance and increased spectral efficiency (e.g., see references [1, 2]). There has been much interest in the art to address various concerns related to encoding, decoding, modulation, and transmission for an ODB communication system. Oftentimes, modulation in such communication systems is achieved using a Mach-Zehnder modulator biased at its null point. Therein, three levels of signal in terms of electric field (e.g., −1, 0 +1) are employed. In terms of optical power, only two signal levels are transmitted.

Optical DPSK (sometimes alternatively referred to as oDPSK) consists in representing a logical "0" by a phase the optical wave/signal equal to 0 and a logical "1" by a phase of $\pi$ or 180 degrees. By ensuring that the optical intensity remains constant, such a modulation type has a high tolerant towards non-linearities. DPSK is closely related to ODB (e.g., see reference [3]) and can be considered as a duobinary signal.

DQPSK encodes data arranged in di-bits (groups of two bits) into one of four phase difference values, such as: 00→0, 01→$\pi/2$, 11→$\pi$, 10→−$\pi/2$. This may be considered as two DPSK channels operating in parallel with one arm subject to a $\pi/2$ or 90 degrees phase shift to put the two fields in quadrature (e.g., see reference [4]).

On the other hand, traditional optical receivers typically perform a minimal amount of signal processing. Recently, electronic compensation of channel impairments such as chromatic or polarization-mode dispersion (PMD) have been discussed in accordance with attempts to improve performance and brings flexibility of signal processing to the optical communication systems (e.g., see references [5, 6]).

An optical receiver communication device may be implemented to perform the optical to electronic (or electrical) conversion of signals using a photo detector or photo diode; such devices are sensitive to the optical power of a received signal (e.g., by producing a photo-current that corresponds to the optical intensity/power of the received optical signal that arrives at the photo detection surface).

In an ODB communication system, though three levels of signals have been transmitted, only two different levels are received from the perspective of photo detection. Therefore, a conventional or prior art type of electronic dispersion compensation (EDC) circuit circuitry has a significant drawback to compensate the difference between −1 and +1 signals.

In the optical DPSK communication system, the transmitted field over the optical fiber is a differential precoded signal. At the receiver side of the optical communication channel, the differential coded signal is demodulated using a delay line interferometer and balanced detector or direct detector. Therefore, a conventional EDC circuitry does not compensate for the optical field transmitted over the fiber directly. The conventional EDC circuitry for an optical DQPSK communication system suffers the similar problem.

Herein, a novel EDC circuitry and EDC approach is presented that is operative to compensate fully for any incurred channel impairments and is applicable to each of an ODB communication system, a DPSK communication system, and a DQPSK communication system. This is achieved, at least in part, by employing a reconstruction circuit that operates to perform such EDC in the electronic domain. An electronic signal is generated that is emulative of an optical signal that is received from the optical communication link.

Figure 2:
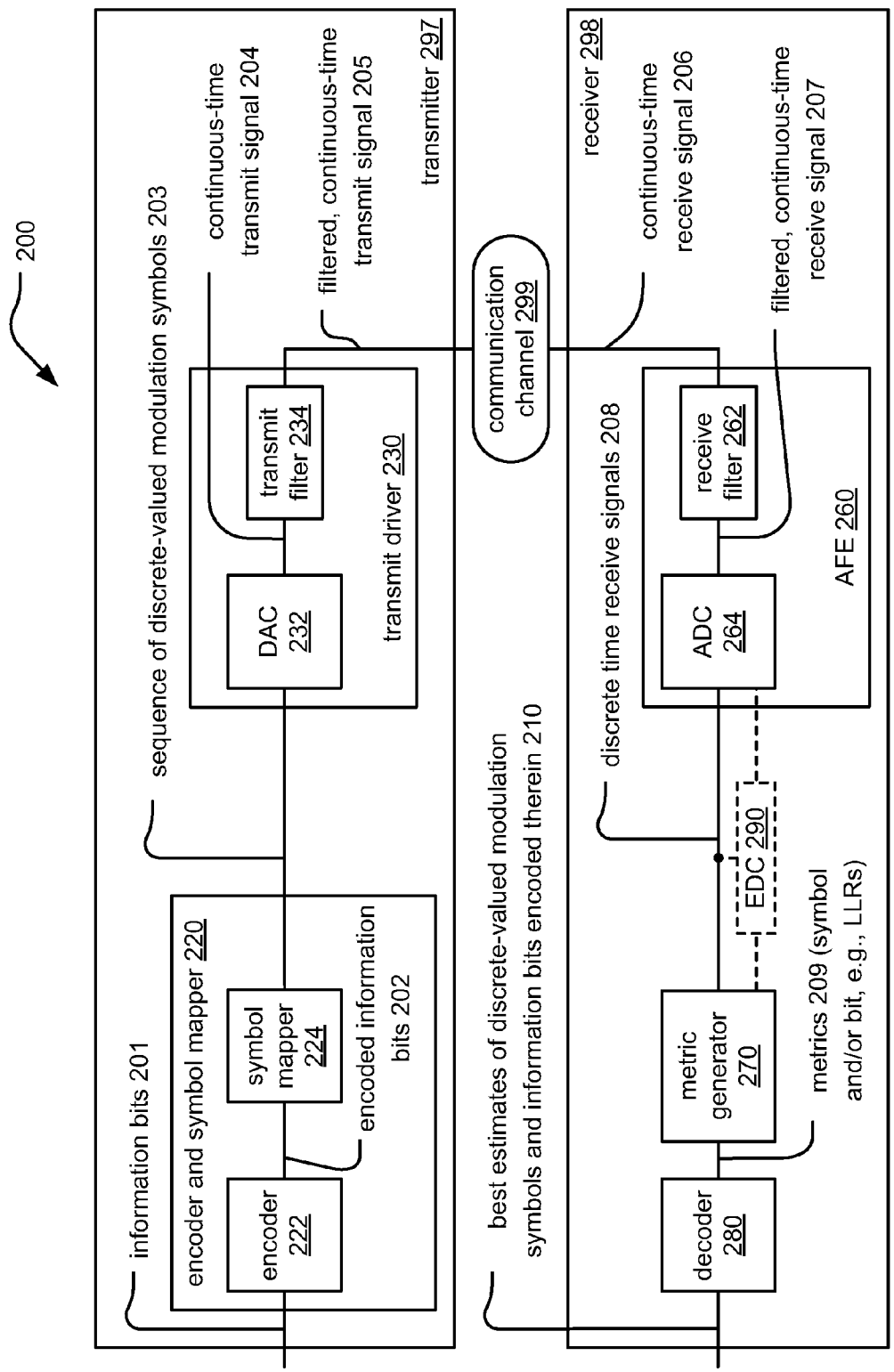

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction, and channel coding schemes are often employed. Generally, these error correction and channel coding schemes involve the use of an encoder at the transmitter and a decoder at the receiver. Of course, any such communication device implemented within such a communication system as described herein, or other type of communication system, may itself be transceiver type communication device that includes an encoder module therein for encoding signals to be transmitted (e.g., encoding information within signals), and also includes a decoder module therein for decoding signals that are received (e.g., decoding signals to make estimate of information encoded therein).

Any of the various types and embodiments of encoding and/or decoding described herein can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

As mentioned above, while many different types of communication systems are depicted with respect to various types of communication systems, any such communication system that includes at least one optical network portion, segment, or communication link, etc. therein can employ various aspects of the invention.

Referring to the communication system 200 of FIG. 2, at a transmitting end of a communication channel 299, information bits 201 are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

The decoders and/or receiver portions of either of the previous embodiments may be implemented to include various aspects and/or embodiment of the invention therein. For example, considering the embodiment of FIG. 2, electronic dispersion compensation (EDC) circuitry 290 is interposed between the ADC 264 of the AFE 260 and the metric generator 270. Alternatively, such EDC functionality could also be implemented within other portions of the receiver 298 of the FIG. 2 (e.g., within the decoder 280, or elsewhere therein). Such EDC functionality allows for performing compensation of optical incurred deficiencies (e.g., dispersion, non-linearity, inter-symbol interference (ISI), etc.). Within a communication device's receiver portion, equalization and compensation is performed in the electronic domain as adapted for high speed applications and higher order modulation schemes. Compare this to attempting to perform such compensation in the optical domain within a receiver communication device. By performing equalization and compensation in the electronic domain (as opposed to attempting to perform such equalization and compensation in the optical domain), higher speed applications and advanced modulation schemes may be properly addressed in accordance with the principles presented herein.

In addition, several of the following Figures describe other and particular embodiments (some in more detail) that may be used to support the devices, systems, functionality and/or methods that may be implemented in accordance with certain aspects and/or embodiments of the invention.

Figure 3:
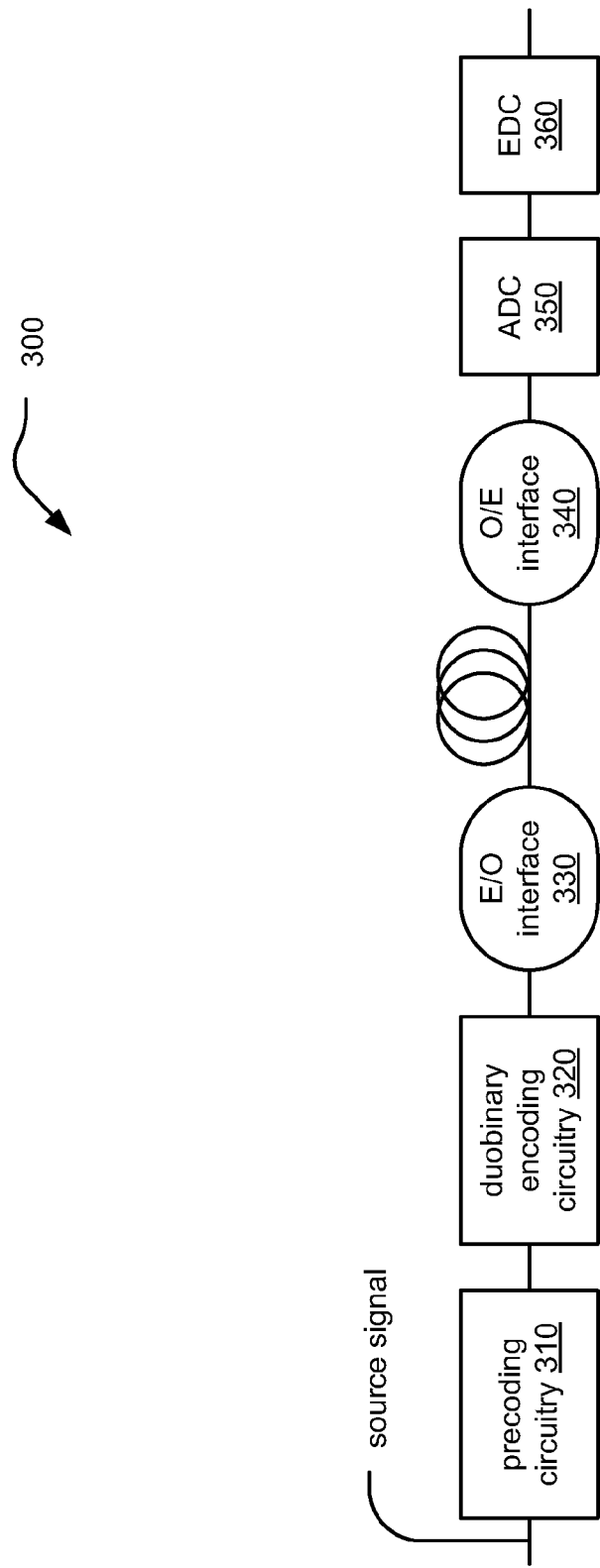
FIG. 3 illustrates an embodiment of an optical duobinary (ODB) communication system.

FIG. 3 illustrates an embodiment of an optical duobinary (ODB) communication system 300. In such an ODB communication system 300, an original signal (e.g., source signal) is initially provided to a precoding circuitry 310 that is operative to perform differential encoding. After undergoing differential encoding in the precoding circuitry 310, then the differential encoded signal undergoes duobinary encoding in the differential encoding circuitry 320. Thereafter, the precoded and duobinary encoded signal is provided to an electrical to optical interface 330 (e.g., which may be implemented as any of a variety of light sources [such as a dual-drive Mach-Zehnder type optical intensity modulator with push-pull operation, a light emitting diode (LED) or a laser diode (LD) whose output intensity may be modulated, etc.] suitable to generate an optical signal to be launched into an optical communication link [such as an optical fiber]).

After the electrical signal is converted to an optical signal, the optical signal is propagated through the optical communication link (e.g., an optical fiber) to the receiver side of the communication channel. On the receiver side, the optical signal is converted from an optical signal to an electrical signal (e.g., using a photo-detector device such as a photo-diode that generates a current corresponding to the intensity of the light striking the photo-sensitive service). This now-generated electrical signal can go directly to a decision circuit (e.g., a hard limiter or slicer) to convert it to digital binary signal. Alternatively, the now-generated electrical signal can be provided to an analog to digital converter (ADC) circuitry 350 and subsequently to an electronic dispersion compensation (EDC) circuitry 360 for extra and/or subsequent dispersion compensation to address any deficiencies that may be incurred during transmission via the optical communication channel (e.g., inter-symbol interference (ISI), dispersion, or non-linearity corresponding to or associated with one or more of the optical components of the optical communication channel or communication system).

Figure 4:
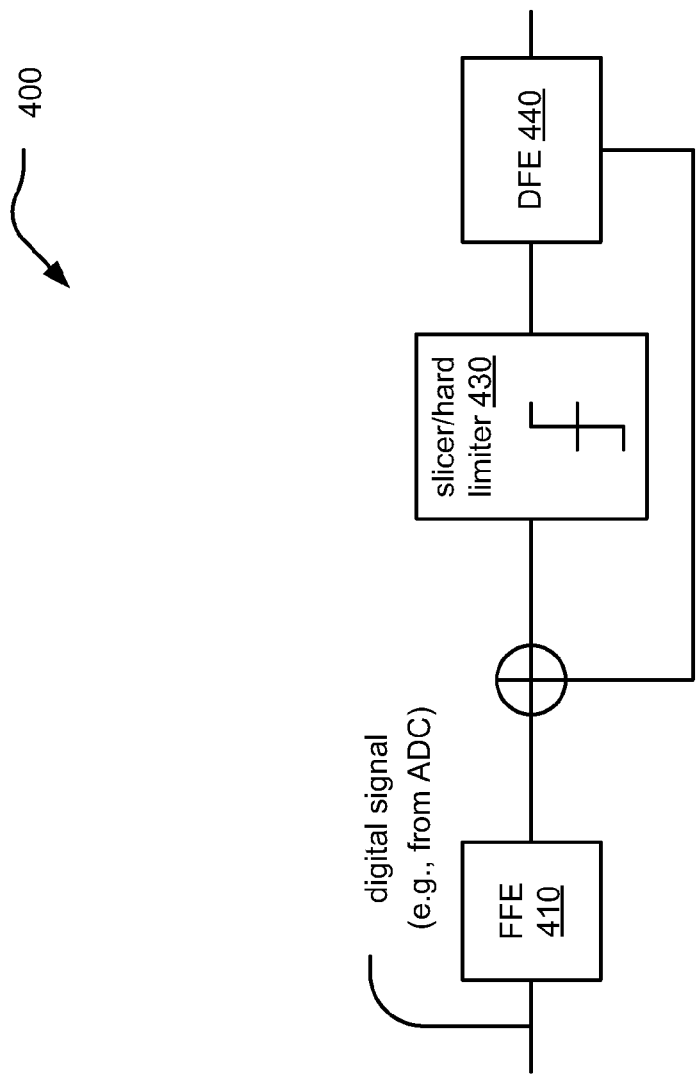
FIG. 4 illustrates an embodiment of an electronic dispersion compensation (EDC) circuitry.

FIG. 4 illustrates an embodiment of an electronic dispersion compensation (EDC) circuitry 400. This diagram shows a decision feedback equalizer (DFE) type EDC circuitry in which a digital signal (e.g., such as may be generated by an ADC or as may be output from some other type of digital processing component) is initially provided to a feed forward equalizer (FFE) 410. The FFE 410 is operative to equalize any pre-cursor ISI. The output from the FFE 410 is operative to provide a signal to a summer circuitry that is operative to add a feedback signal to the signal provided from the FFE 410. A slicer or hard limiter 430 is operative to make a hard estimate for the signal provided from the summer circuitry. From the slicer or hard limiter 430, the hard estimate is provided to a decision feedback equalizer (DFE) circuitry 440. The DFE circuitry 440 is implemented after the decision circuit (e.g., the slicer or hard limiter 430) and is operative to remove the post-cursor ISI that may be existent in the signal. The DFE circuitry 440 is operative to generate the feedback signal provided back to the summer circuitry.

Figure 5:
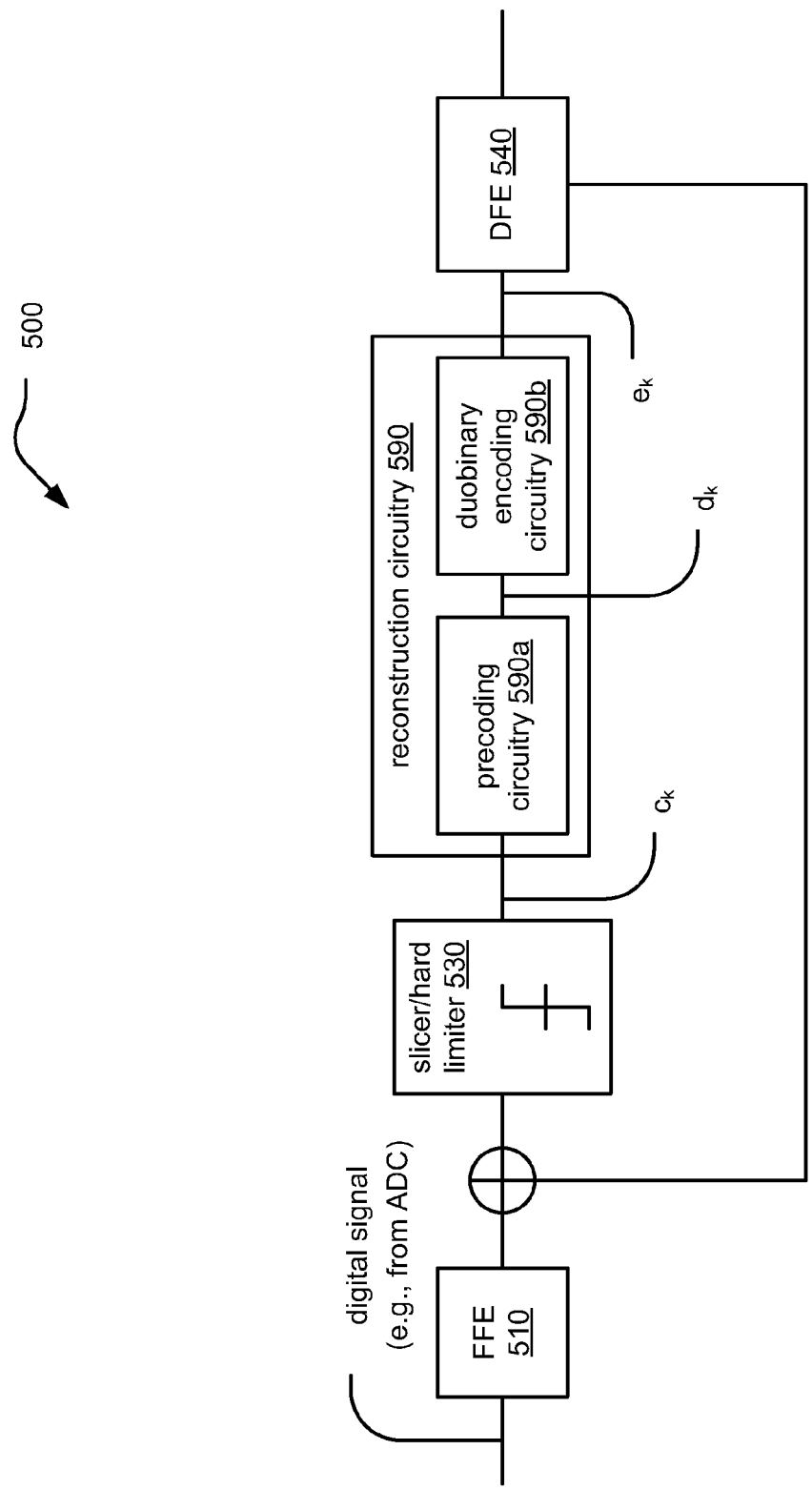
FIG. 5 illustrates an embodiment of an EDC circuitry for an ODB receiver communication device.

FIG. 5 illustrates an embodiment of an EDC circuitry 500 for an optical duobinary (ODB) receiver communication device. This diagram shows the DFE type EDC circuitry as may be applied for use in an ODB communication system.

A digital signal (e.g., such as may be generated by an ADC or as may be output from some other type of digital processing component) is initially provided to a FFE 510. The FFE 510 is operative to equalize any pre-cursor ISI. The output from the FFE 510 is operative to provide a signal to a summer circuitry that is operative to add a feedback signal to the signal provided from the FFE 510. A slicer or hard limiter 530 is operative to make a hard estimate for the signal provided from the summer circuitry. From the slicer or hard limiter 530, the hard estimate is provided to a reconstruction circuitry 590, that itself includes precoding circuitry 590a and duobinary encoding circuitry 590b. The output of the reconstruction circuitry 590 is provided to a DFE circuitry 540, which generates the feedback signal provided back to the summer circuitry.

Because of the nature of an ODB communication system, there are typically only two level of electric signals {0, 1} detected or employed at the receiver side of the communication channel, where actually {1} actually represents two possible optical field signals {+1, −1}. In order to compensate for optical impairments between {+1, −1}, reconstruction of the duobinary encoded signal is performed. Therefore, differential encoding circuit and duobinary encoding is added after the decision logic (shown as slicer or hard limiter 530).

For the differential encoding (precoding):

$$d_k = c_k \oplus d_{k-1} \tag{1}$$

For the duobinary encoding:

$$e_k = d_k + d_{k-1} - 1 \tag{2}$$

The DFE circuitry 540 has different coefficients between the {−1 +1} signals.

The above DFE mentioned DFE circuitry 540 may also modified by splitting the DFE circuitry 540 into two separate and distinct DFE circuitries.

Figure 6:
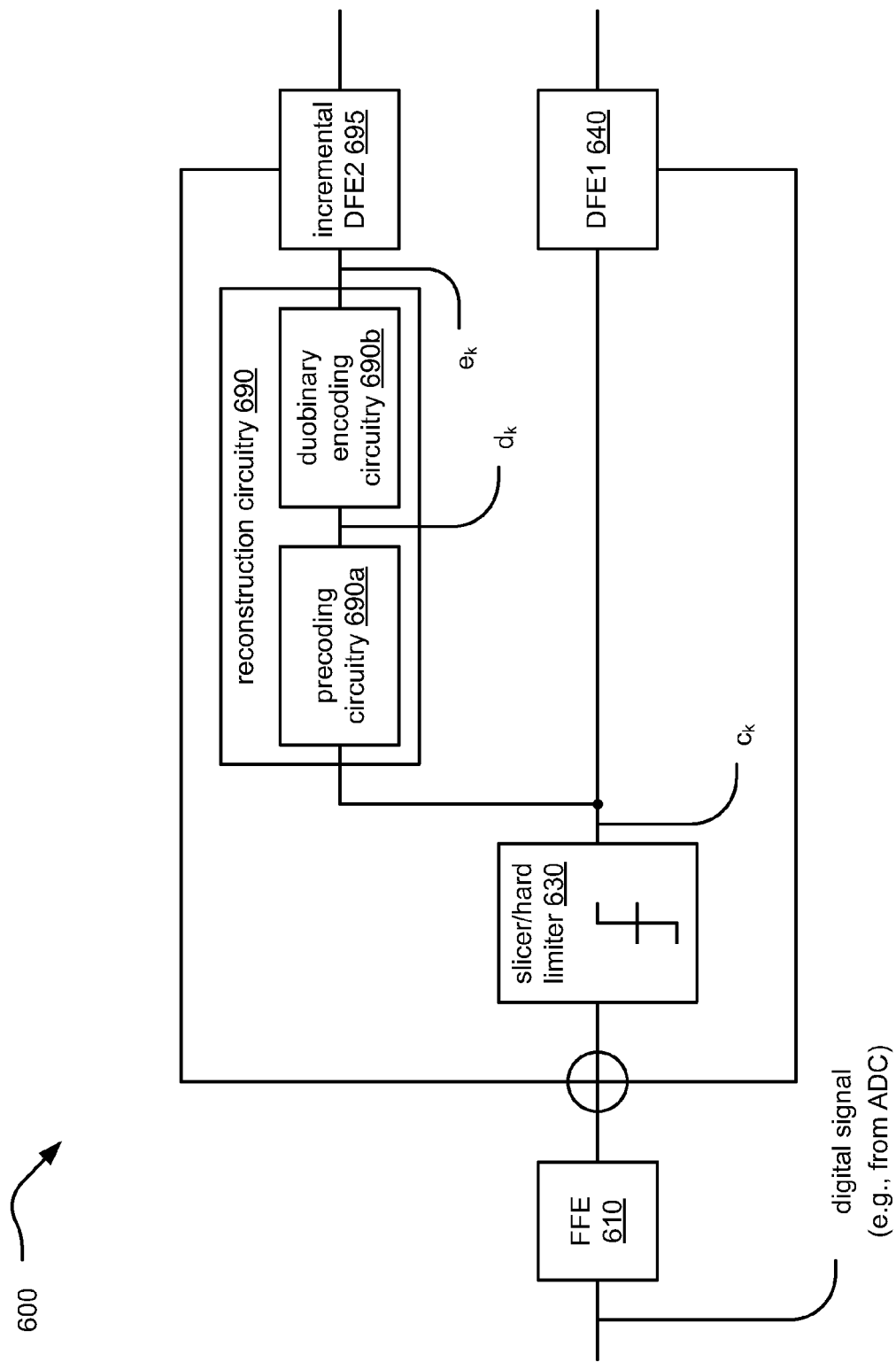
FIG. 6 illustrates an embodiment of an EDC circuitry for an ODB receiver communication device that employs two separate decision feedback equalizers (DFEs).

FIG. 6 illustrates an embodiment of an EDC circuitry 600 for an ODB receiver communication device that employs two separate decision feedback equalizers (DFEs). This diagram has some similarities to the previous embodiment, with at least one difference being that the DFE circuitry 540 (of the previous embodiment) into two separate and distinct DFE circuitries.

A digital signal (e.g., such as may be generated by an ADC or as may be output from some other type of digital processing component) is initially provided to a FFE 610. The FFE 610 is operative to equalize any pre-cursor ISI. The output from the FFE 610 is operative to provide a signal to a summer circuitry that is operative to add a first feedback signal and a second feedback signal to the signal provided from the FFE 610. A slicer or hard limiter 630 is operative to make a hard estimate for the signal provided from the summer circuitry. From the slicer or hard limiter 630, the hard estimate is provided to a reconstruction circuitry 690 and also simultaneously to a DFE1 circuitry 640, which generates a first of the two feedback signals provided back to the summer circuitry. The reconstruction circuitry 690 includes precoding circuitry 690a and duobinary encoding circuitry 690b. The output of the reconstruction circuitry 690 is provided to an incremental DFE2 circuitry 695, which generates a second of the two feedback signals provided back to the summer circuitry.

The EDC circuitry 600 may be implemented within a communication device (e.g., generally referred to as an apparatus) that is operative to receive an optical signal from an optical communication channel. Such a communication device may include an optical to electrical interface circuitry that is operative to process the optical signal thereby generating an electrical signal, and the communication device may also include an ADC that is operative to sample the electrical signal thereby generating a first digital signal. The EDC circuitry 600, operating in an electronic domain, is operative to process the first digital signal thereby generating a second digital signal that is emulative of the optical signal, and to equalize the second digital signal in the second digital signal to compensate for at least one deficiency corresponding to the optical signal.

Comparing this diagram to the previous embodiment, this diagram shows a DFE type EDC circuitry with a split DFE (e.g., two separate and distinct DFE circuitries). The major DFE1 circuitry 640 is analogous and similar to the DFE circuitry 540 of the previous embodiment while the incremental DFE2 circuitry 695 is operative to compensate for the difference between {−1, +1} signals.

It is noted that certain embodiments may also employ a maximum likelihood sequence detection (MLSD) scheme (e.g., as described in reference [7]) to determine the sequence of data symbols that best matches an observed sequence of signal samples that have been corrupted by noise and interference. A common implementation of an MLSD scheme involves the Viterbi algorithm or a Viterbi detection approach. A MLSD type EDC for optical fiber communication has been demonstrated in reference [8].

For an ODB communication system, the use of MLSD necessarily increases the overall complexity of a communication device implemented within such a communication system. Instead of two levels of signals being associated with each incoming symbol, there are instead three levels of the signal. To make the situation even more complex, not all sequences formed using the three distinct levels of signals {0, −1, +1} are allowable or legal in accordance with the encoding process. For example, the sequence having a transition from "−1, +1" is not an allowed or legal sequence in accordance with the encoding process.

By adding a reconstruction circuitry (e.g., such as reconstruction circuitry 690) in the receiver, the channel estimator operation can be written as:

$$y_n = \beta(e_{n+m}, e_{n+m-1}, \ldots, e_{n-m+1}) = \beta(d_{n-m+1}, c_{n+m}, c_{n+m-1}, \ldots, c_{n-m+1}) \quad (3)$$

Above, as also depicted in the diagram, the variables associated with c are being output from the slicer or hard limiter 630, the variables associated with e are being output from the reconstruction circuitry 690. In addition, the variables associated with d are being output from the precoding circuitry 690a that is implemented within the reconstruction circuitry 690.

Where the relationship between e and d, c follows from equation (1) and (2) and we also assume at time n, the channel response depends on the m bits appearing before and the m bits appearing after time n in path.

A Viterbi detector or Viterbi algorithm can be applied directly after this modified channel estimator.

Figure 7:
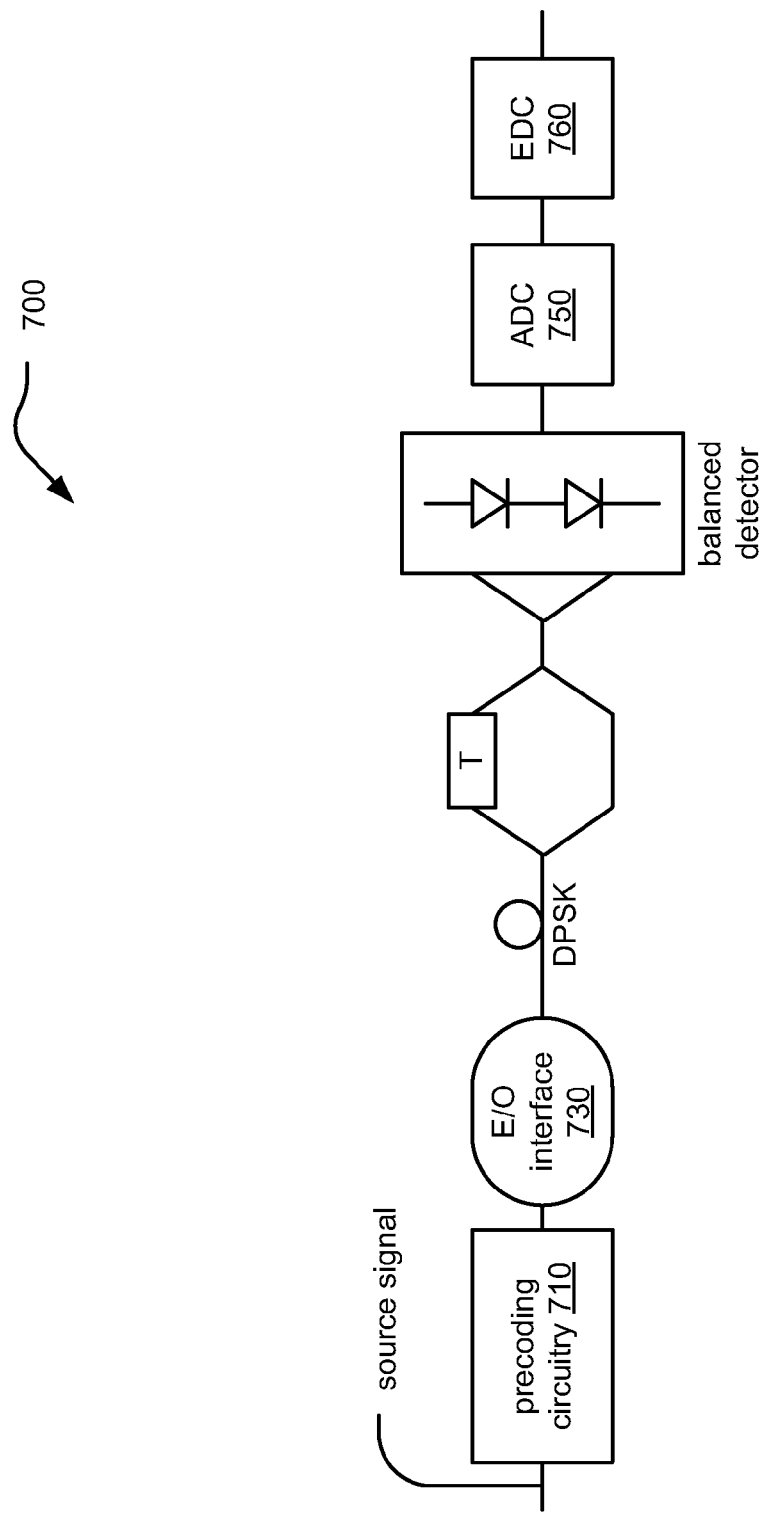
FIG. 7 illustrates an embodiment of an optical differential phase shift keying (DSPK) communication system.

FIG. 7 illustrates an embodiment of an optical differential phase shift keying (DSPK) communication system 700. In such a DSPK communication system 700, an original signal (e.g., source signal) is initially provided to a precoding circuitry 710 that is operative to perform differential encoding. After undergoing differential encoding in the precoding circuitry 710, then the differential encoded signal is provided to an electrical to optical interface 730 (e.g., which may be implemented as any of a variety of light sources [such as a dual-drive Mach-Zehnder type optical intensity modulator with push-pull operation, a light emitting diode (LED) or a laser diode (LD) whose output intensity may be modulated, etc.] suitable to generate an optical signal to be launched into an optical communication link [such as an optical fiber]).

After the electrical signal is converted to an optical signal, the optical signal is propagated through the optical communication link (e.g., an optical fiber) to the receiver side of the communication channel. On the receiver side, the optical signal is first demodulated by delay line interferometer (shown as T in the diagram). Thereafter, the optical signal is converted to electrical signal using direct detector (DD) or balanced detector type device. For example, such a DD or balanced detector type device is used to convert the optical signal to an electrical signal.

This now-generated electrical signal can go directly to a decision circuit (e.g., a hard limiter or slicer) to convert it to digital binary signal. Alternatively, the now-generated electrical signal can be provided to an analog to digital converter (ADC) circuitry 750 and subsequently to an electronic dispersion compensation (EDC) circuitry 760 for extra and/or subsequent dispersion compensation to address any deficiencies that may be incurred during transmission via the optical communication channel (e.g., inter-symbol interference (ISI), dispersion, or non-linearity corresponding to or associated with one or more of the optical components of the optical communication channel or communication system).

Figure 8:
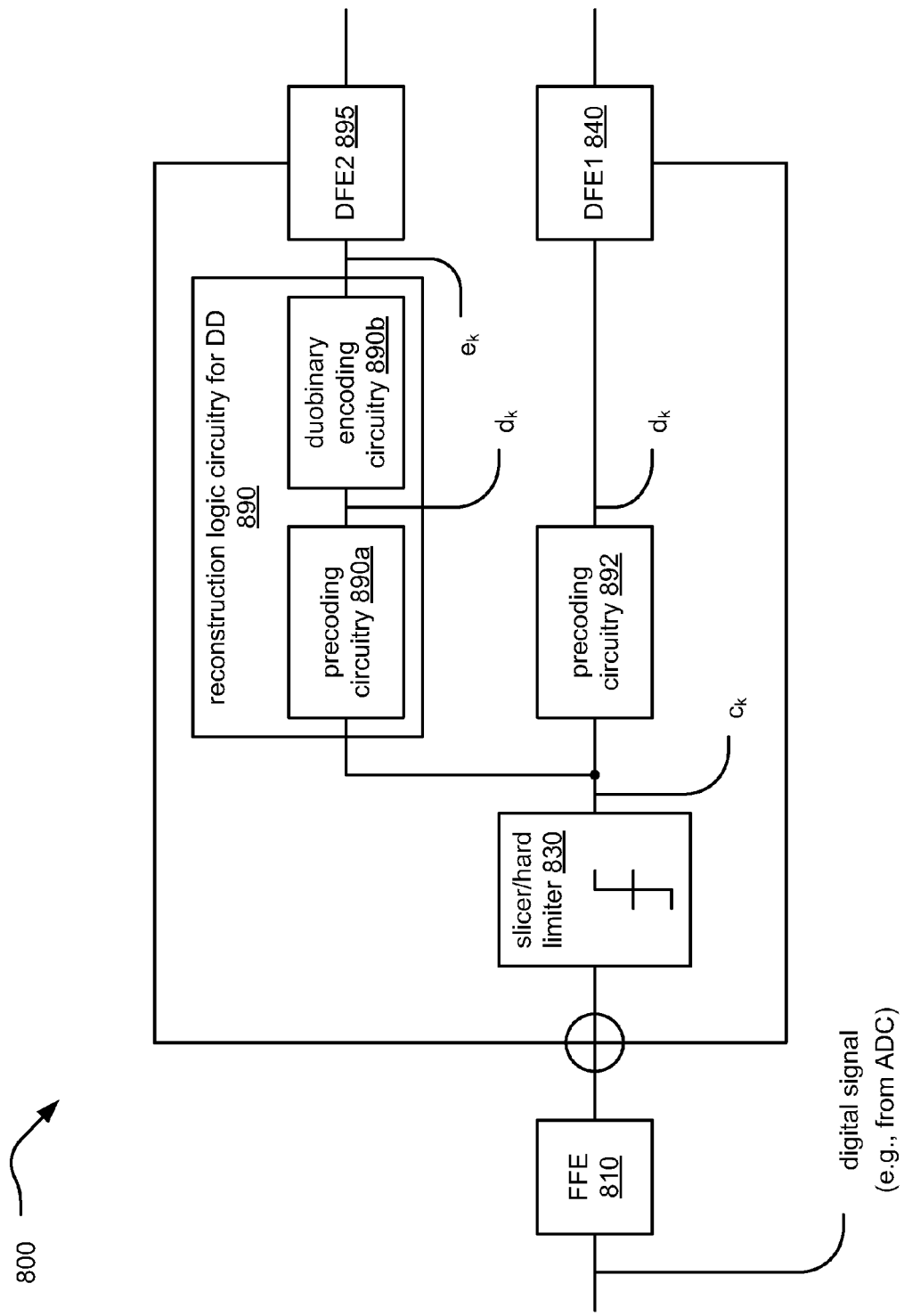
FIG. 8 illustrates an embodiment of an EDC circuitry for a DSPK receiver communication device that employs two separate DFEs.

FIG. 8 illustrates an embodiment of an EDC circuitry 800 for a DSPK receiver communication device that employs two separate DFEs. A digital signal (e.g., such as may be generated by an ADC or as may be output from some other type of digital processing component) is initially provided to a FFE 810. The FFE 810 is operative to equalize any pre-cursor ISI. The output from the FFE 810 is operative to provide a signal to a summer circuitry that is operative to add a first feedback signal and a second feedback signal to the signal provided from the FFE 810. A slicer or hard limiter 830 is operative to make a hard estimate for the signal provided from the summer circuitry. From the slicer or hard limiter 830, the hard estimate is provided to a reconstruction circuitry for DD 890 and also simultaneously to a precoding circuitry 892. The output from the precoding circuitry 892 is provided to DFE1 circuitry 840, which generates a first of the two feedback signals provided back to the summer circuitry. The reconstruction circuitry for DD 890 includes precoding circuitry 890*a* and duobinary encoding circuitry 890*b*. The output of the reconstruction circuitry 890 is provided to DFE2 circuitry 895, which generates a second of the two feedback signals provided back to the summer circuitry.

As described with reference to other embodiments, the EDC circuitry 800 may be implemented within a communication device (e.g., generally referred to as an apparatus) that is operative to receive an optical signal from an optical communication channel. Such a communication device may include an optical to electrical interface circuitry that is operative to process the optical signal thereby generating an electrical signal, and the communication device may also include an ADC that is operative to sample the electrical signal thereby generating a first digital signal. The EDC circuitry 800, operating in an electronic domain, is operative to process the first digital signal thereby generating a second digital signal that is emulative of the optical signal, and to equalize the second digital signal in the second digital signal to compensate for at least one deficiency corresponding to the optical signal.

In this diagram, two separate and distinct DFE circuitries are implemented (e.g., depicted as DFE1 840 and DFE2 895). DFE1 circuitry 840 is operative to compensate the impairment due to communication over the optical fiber. DEF2 circuitry 895 is operative to compensate the impairment due to electronic components within the apparatus (e.g., such as a photo detector or photo diode, ADC circuitry, etc.). Because the optical signal over the fiber is a precoded signal and therefore, the signal is reconstructed using the precoding logic in accordance with the reconstruction logic circuitry for DD 890.

In this diagram, the reconstruction logic circuitry for DD 890 is implemented for a direct detector. If it is not implemented for a DD type device, the difference between +1 and −1 may be not be adequately compensated. Alternatively, for a balanced detector, such operation is not needed.

Figure 9:
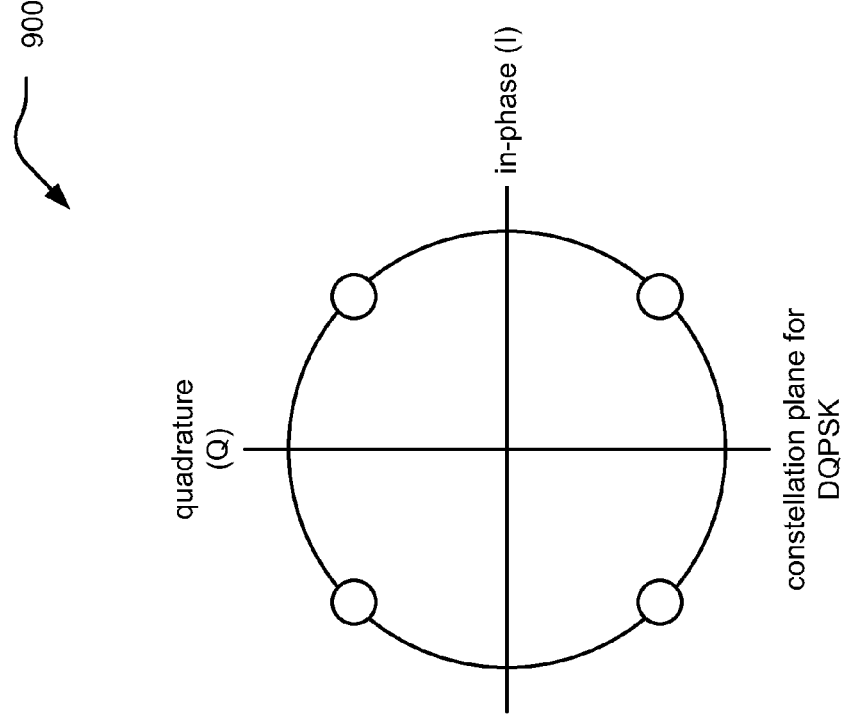
FIG. 9 illustrates an embodiment of a constellation plane for differential quadrature phase shift keying (DQSPK) modulation.

FIG. 9 illustrates an embodiment of a constellation plane 900 for differential quadrature phase shift keying (DQSPK) modulation. A DQPSK transmission scheme accumulates 2 bits per symbol, so 4 symbols are transmitted over the optical communication channel (e.g., optical fiber) per symbol. This diagram shows the constellation plane of such a DQPSK system. DQPSK can be considered to combine two DPSK channels together, one is an in-phase (I) channel which is in phase and the other is a quadrature (Q) channel which is at quadrature phase. In such an application, a balanced detector is typically used.

Figure 10:
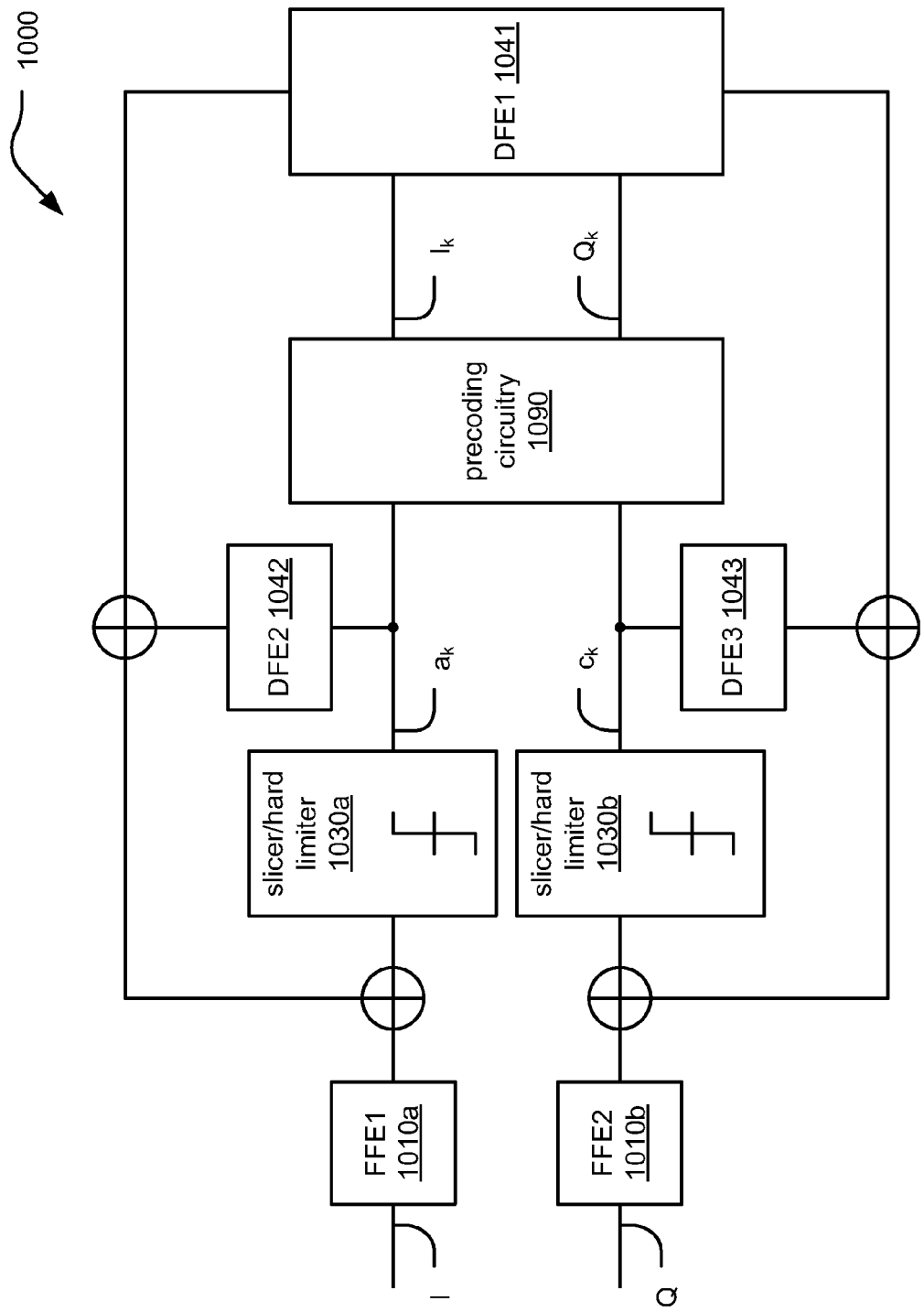
FIG. 10 illustrates an embodiment of an EDC circuitry for a DQSPK receiver communication device that employs three separate DFEs.

FIG. 10 illustrates an embodiment of an EDC circuitry 1000 for a DQSPK receiver communication device that employs three separate DFEs. This diagram shows the DFE type equalizer as may be applied for optical DQPSK system.

A digital signal (e.g., such as may be generated by an ADC or as may be output from some other type of digital processing component) is composed of an in-phase (I) digital signal component and a quadrature (Q) digital signal component. The in-phase (I) digital signal (e.g., such as provided from an ADC or other digital processing component) is initially provided to a first FFE1 1010*a*. The quadrature (Q) digital signal (e.g., such as provided from an ADC or other digital processing component) is initially provided to a second FFE2 1010*b*.

A first summer circuitry, coupled to the first FFE1 1010*a*, is operative to sum the processed, in-phase digital signal output from the first FFE1 1010*a* with a first feedback signal thereby generating a first summed signal. A first slicer or hard limiter circuitry 1030*a*, coupled to the first summer circuitry, is operative to generate a first hard estimate corresponding to the first summed signal. A DFE2 circuitry 1042, coupled to the first slicer or hard limiter circuitry 1030*a*, is operative to process the first hard estimate thereby generating a first equalized signal.

A precoding circuitry 1090, coupled to the first slicer or hard limiter circuitry 1030*a*, that is operative to process the first hard estimate thereby generating a precoded in-phase signal. DFE1 circuitry 1041, coupled to the precoding circuitry 1090, is operative to process the precoded in-phase signal thereby generating a second feedback signal.

A second summer circuitry, coupled to the DFE1 circuitry 1041 and the DFE2 circuitry 1042, is operative to sum the first equalized signal and the second feedback signal thereby generating the first feedback signal.

A second FFE2 1010*b* is operative to process the quadrature (Q) digital signal component. A third summer circuitry, coupled to the second FFE2 1010*b*, is operative to sum the processed, quadrature digital signal output from the second FFE2 1010*b* with a third feedback signal thereby generating a second summed signal. A second slicer or hard limiter circuitry 1030*b*, coupled to the third summer circuitry, is operative to generate a second hard estimate corresponding to the second summed signal. A DFE3 circuitry 1043, coupled to the second slicer or hard limiter circuitry 1030*b*, is operative to process the second hard estimate thereby generating a second equalized signal.

The precoding circuitry 1090, being also coupled to the second slicer or hard limiter circuitry 1030*b*, is operative to process the second hard estimate thereby generating a precoded quadrature signal. The DFE3 circuitry 1043 is also operative to process the precoded quadrature signal thereby generating a fourth feedback signal. A fourth summer circuitry, coupled to the DFE1 circuitry 1041 and the DFE3 circuitry 1043, that is operative to sum the second equalized signal and the fourth feedback signal thereby generating the third feedback signal.

As described with reference to other embodiments, the EDC circuitry 1000 may be implemented within a communication device (e.g., generally referred to as an apparatus) that is operative to receive an optical signal from an optical communication channel. Such a communication device may include an optical to electrical interface circuitry that is operative to process the optical signal thereby generating an electrical signal, and the communication device may also include an ADC that is operative to sample the electrical signal thereby generating a first digital signal. The EDC circuitry 1000, operating in an electronic domain, is operative to process the first digital signal thereby generating a second digital signal that is emulative of the optical signal, and to equalize the second digital signal in the second digital signal to compensate for at least one deficiency corresponding to the optical signal.

In this diagram, three DFEs (DFE1 circuitry 1041, DFE2 circuitry 1042, and the DFE3 circuitry 1043) are shown in the system. DFE1 circuitry 1041 is operative to compensate the impairment due to communication over the optical fiber. DFE2 circuitry 1042 and DFE3 circuitry 1043 are operative to compensate any impairment that may be due to electronic components within the apparatus (e.g., as maybe generated by a photo detector or photo diode and/or ADC circuitry) for each of the I channel and Q channel, respectively. Because the optical signal transmitted over the optical communication link (e.g., the optical fiber) is precoded signal and therefore, the signal may be reconstructed using precoding logic (alternative embodiments of such are described in reference [9]):

$$I_k = a_k b_k I_{k-1} + a_k \overline{b}_k Q_{k-1} + \overline{a}_k \overline{b}_k I_{k-1} + \overline{a}_k b_k Q_{k-1} \quad (4)$$

$$Q_k = a_k b_k Q_{k-1} + a_k \overline{b}_k I_{k-1} + \overline{a}_k \overline{b}_k Q_{k-1} + \overline{a}_k b_k I_{k-1} \quad (5)$$

In the diagram, a balanced detector is assumed and, as such, there is no need for reconstruction logic circuitry therein.

For an MLSD type EDC circuitry as applied for a DPSK/DQPSK communication system, the architecture it is similar to MLSD type EDC for ODB system. As the case for the DFE type EDC for DPSK/DQPSK, the channel estimator can be partitioned/split into two parts:

$$y_n = \beta 1 + \beta 2 \quad (6)$$

While β1 is the channel estimator from the fiber part, which is the direct function of the precoded signal, and β2 is the channel estimator from the photo detector and other parts which is the direct function of decoded signal for balanced detector.

For design using LMS (least mean square) error (as described in reference [6], the corresponding U.S. utility patent application of which is incorporated herein by reference above) to do timing recovery, channel estimation is performed. Accurate channel estimation also employs a reconstruction logic circuit for ODB/DPSK/DQPSK, similar to the case for MLSD type EDC.

Figures 11A, 11B:
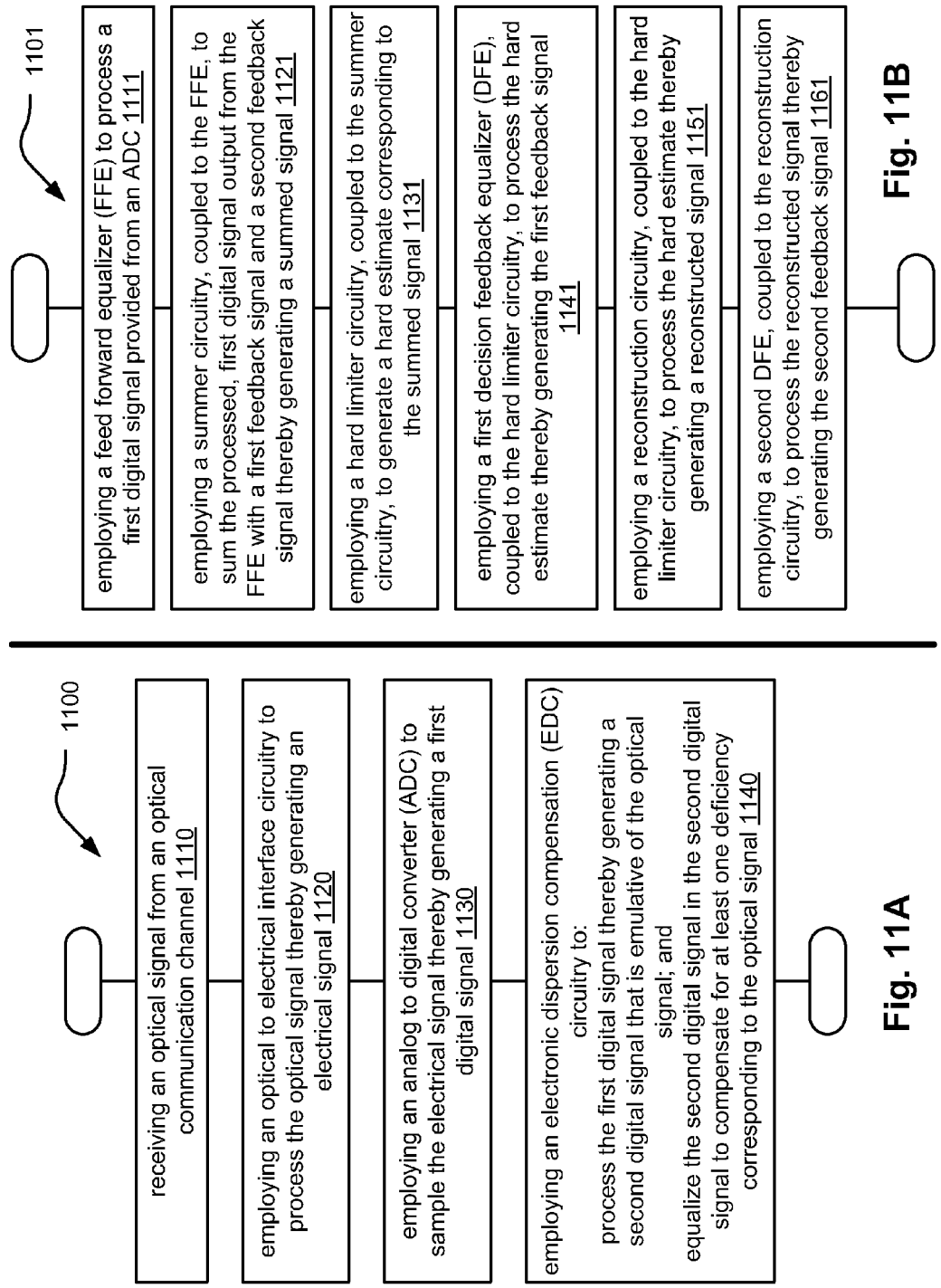
FIG. 11A and FIG. 11B illustrate various embodiments of methods for performing electronic dispersion compensation in the electronic domain using reconstruction for a communication device implemented within an optical communication system.

FIG. 11A and FIG. 11B illustrate various embodiments of methods 1100 and 1101 for performing electronic dispersion compensation in the electronic domain using reconstruction for a communication device implemented within an optical communication system.

Referring to method 1100 of FIG. 11A, the method 1100 begins by receiving an optical signal from an optical communication channel, as shown in a block 1110. While this communication channel may be optical in nature, it is noted that there may be other communication links within the communication system that may be implemented using alternative types of technology (e.g., wireless communication links, wired communication links, etc.). The method 1100 continues by employing an optical to electrical interface circuitry to process the optical signal thereby generating an electrical signal, as shown in a block 1120. This process may be viewed as performing optical to electronic conversion of a signal such as using a photo-detector circuitry (alternatively, referred to as a photo-diode circuitry).

The method 1100 then operates by employing an analog to digital converter (ADC) to sample the electrical signal thereby generating a first digital signal, as shown in a block 1130. Generally speaking, this operation corresponds to performing digital sampling of a continuous time signal as generated by and output from the optical to electrical interface circuitry.

As shown in a block 1140, the method 1100 then operates by employing an electronic dispersion compensation (EDC) circuitry, being coupled to the ADC, to perform electronic domain compensation for one or more deficiencies (e.g., inter-symbol interference (ISI), dispersion, and non-linearity, etc.) that is associated with the optical signal received from the optical communication channel. Generally, such deficiencies associated with the optical signal are incurred with imperfections of the optical communication channel and/or optical hardware components implemented in and associated with the optical communication system that includes the optical communication channel. The operation of the block 1140 operates to process the first digital signal thereby generating a second digital signal that is emulative of the optical signal (e.g., the one received from the from optical communication channel. The operation of the block 1140 also operates to process equalize the second digital signal in the second digital signal to compensate for at least one deficiency corresponding to the optical signal.

Referring to method 1101 of FIG. 11B, the method 1101 begins by employing a feed forward equalizer (FFE) to process a first digital signal provided from an ADC, as shown in a block 1111. Generally speaking, the first digital signal output from the ADC may be viewed as a digital signal generated by performing digital sampling of a continuous time signal as generated by and output from an optical to electrical interface circuitry. The FFE is operative to equalize post-cursor ISI that may be existent within an optical signal that is received from an optical communication channel.

The method 1101 then operates by employing a summer circuitry, coupled to the FFE, to sum the processed, first digital signal output from the FFE with a first feedback signal and a second feedback signal thereby generating a summed signal, as shown in a block 1121. The first feedback signal and the second feedback signal are generated as described below. The method 1101 continues by employing a hard limiter circuitry, coupled to the summer circuitry, to generate a hard estimate corresponding to the summed signal, as shown in a block 1131. A hard limiter may alternatively be referred to as a slicer.

The method 1101 then operates by employing a first decision feedback equalizer (DFE), coupled to the hard limiter circuitry, to process the hard estimate thereby generating the first feedback signal (e.g., that is employed and referenced in the block 1121), as shown in a block 1141. The method 1101 then operates by employing a reconstruction circuitry, coupled to the hard limiter circuitry, to process the hard estimate thereby generating a reconstructed signal, as shown in a block 1151.

The method 1101 continues by employing a second DFE, coupled to the reconstruction circuitry, to process the reconstructed signal thereby generating the second feedback signal (e.g., that is employed and referenced in the block 1121), as shown in a block 1161.

It is noted that the operations as performed by the reconstruction circuitry (e.g., such as those performed and referenced in the block 1151) may also involve employing a precoding circuitry (being a component of the reconstruction circuitry) to process the hard estimate thereby generating a precoded signal. In addition, the operations as performed by the reconstruction circuitry (e.g., such as those performed and referenced in the block 1151) may also involve employing a duobinary encoding circuitry (also being a component of the reconstruction circuitry) to process the precoded signal thereby generating the reconstructed signal.

It is noted that the various modules (e.g., encoding modules, decoding modules, reconstruction circuitries, decision feedback equalizers (DFEs) precoding circuitries, duobinary encoding circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

REFERENCES

1. K. Yonenaga, S. Kuwano, "Dispersion-tolerant Optical Transmission System Using Duobinary Transmitter and Binary Receiver," *Journal of Lightwave Technology*, vol. 15, no. 8, 1997.
2. W. Kaiser, A. Ehrhardt, W. Rosenkranz, and N. Hanik, "Field trial of duobinary transmission over 1720 km at 10 Gbit/s," in *Proc. Eur. Conf. Opt. Communication (ECOC '02)*, vol. 3, Copenhagen, Denmark, 2002, Paper P3.3.
3. D. Penninckx, et al., "Optical Differential Phase Shift Keying (DPSK) and direct detection considered as a duobinary signal," *Proc. 27th Eur. Conf. on Opt. Comm.*, pp. 456-457.
4. R. A Griffin and A. C. Carter, "Optical differential quadrature phase-shift key (oDQPSK) for high capacity optical transmission," in *OFC 2002*, A. Sawchuk, ed., vol. 70 of OSA Trends in Optical and Photonics, paper WX6.
5. J. H. Winters and R. D. Bitlin, "Electrical signal processing techniques in long-haul fiber-optical systems," *IEEE Trans. Commun.*, vol. 38, no. 9, pp. 1439-1453, September 1990.
6. V. Telang, V. Parthasarathy, et al., "Electronic dispersion compensation utilizing interleaved architecture and channel identification for assisting timing recovery," EP 1 892 909 A1.
7. G. David Formey, Jr., "Maximum-Likelihood Sequence Estimation of Digital Sequences in the Presence of Intersymbol Interference," *IEEE Transactions on Information Theory*, vol. IT-18, No. 3, May 1972, pp. 363-378.
8. O. E. Agazzi, et al., "A 90 nm CMOS DSP MLSD Transceiver with Integrated AFE for Electronic Dispersion Compensation of Multimode Optical Fibers at 10 Gb/s," *IEEE Journal of Solid-State Circuits*, Vol. 43., No. 12, December 2008, pp. 2939-2957.
9. Y. Konishi, et al., "True PRBS Transmission of DQPSK by Differential Precoder Employing Parallel Prefix Network," Proc. OFC '06, OThR3. (2006).

What is claimed is:

1. An apparatus, comprising:
an input to receive an optical signal from an optical communication channel;
an optical to electrical interface circuitry to process the optical signal to generate an electrical signal;
an analog to digital converter (ADC) to sample the electrical signal to generate a first digital signal;
an electronic dispersion compensation (EDC) circuitry, coupled to the ADC, that, in an electronic domain, is configured to:
process the first digital signal, via a feed forward equalizer (FFE), to generate a first digital signal output;
sum, via a summer circuitry, the first digital signal output with a first feedback signal and a second feedback signal to generate a summed signal, wherein a first decision feedback equalizer (DFE) circuitry processes a hard estimate to produce the first feedback signal, and a second DFE circuitry processes a reconstructed signal to produce the second feedback signal;
generate the hard estimate, via a hard limiter circuitry, corresponding to the summed signal;
generate a second digital signal emulative of the optical signal based on the first digital signal and the second feedback signal; and
equalize the second digital signal to compensate for at least one deficiency corresponding to the optical signal; and
a reconstruction circuitry to process the hard estimate to generate the reconstructed signal, the reconstruction circuitry including:
a precoding circuitry to process the hard estimate to generate a precoded signal; and
a duobinary encoding circuitry, coupled to the precoding circuitry, to process the precoded signal to generate the reconstructed signal.

2. The apparatus of claim 1, wherein:
the first DFE circuitry to compensate for inter-symbol interference (ISI) associated with the optical signal; and
the second DFE circuitry to compensate for a difference between a maximum value and a minimum value associated with the summed signal.

3. The apparatus of claim 1, wherein:
the at least one deficiency corresponding to the optical signal is inter-symbol interference (ISI), dispersion, or non-linearity corresponding to or associated with at least one optical component of the optical communication channel.

4. The apparatus of claim 1, wherein:
the apparatus is a transceiver or a receiver.

5. An apparatus, comprising:
an input to receive an optical signal from an optical communication channel;
an optical to electrical interface circuitry to process the optical signal thereby generating an electrical signal;
an analog to digital converter (ADC) to sample the electrical signal thereby generating a digital signal including at least one deficiency corresponding to the optical signal, wherein the at least one deficiency is inter-symbol interference (ISI), dispersion, or non-linearity corresponding to or associated with at least one optical component of the optical communication channel; and
a feed forward equalizer (FFE), coupled to the ADC, to process the digital signal and to compensate for the at least one deficiency to produce a processed digital signal output;
a summer circuitry, coupled to the FFE, to sum the processed digital signal output from the FFE with a first feedback signal and a second feedback signal thereby generating a summed signal;
a hard limiter circuitry, coupled to the summer circuitry, to generate a hard estimate corresponding to the summed signal;
a first decision feedback equalizer (DFE) circuitry, coupled to the hard limiter circuitry, to process the hard estimate thereby generating the first feedback signal;
a reconstruction circuitry, coupled to the hard limiter circuitry, to process the hard estimate thereby generating a reconstructed signal, wherein the reconstruction circuitry including:
　a precoding circuitry to process the hard estimate thereby generating a precoded signal; and
　a duobinary encoding circuitry, coupled to the precoding circuitry, to process the precoded signal thereby generating the reconstructed signal; and
a second DFE circuitry, coupled to the reconstruction circuitry, to process the reconstructed signal thereby generating the second feedback signal.

6. The apparatus of claim 5, wherein:
the apparatus includes a hard disk drive (HDD).

7. The apparatus of claim 5, wherein:
the first DFE circuitry is configured to compensate for the at least one deficiency being ISI; and
the second DFE circuitry is configured to compensate for a difference between a maximum value and a minimum value associated with the summed signal.

8. The apparatus of claim 5, wherein:
the apparatus is a transceiver or a receiver.

9. A method, comprising:
receiving an optical signal from an optical communication channel;
employing an optical to electrical interface circuitry to process the optical signal to generate an electrical signal;
employing an analog to digital converter (ADC) to sample the electrical signal to generate a first digital signal;
within an electronic domain, employing an electronic dispersion compensation (EDC) circuitry, coupled to the ADC, to:
　process the first digital signal, via a feed forward equalizer (FFE), to generate a first digital signal output;
　sum, via a summer circuitry, the first digital signal output with a first feedback signal and a second feedback signal to generate a summed signal, wherein a first decision feedback equalizer (DFE) circuitry processes a hard estimate to produce the first feedback signal, and a second DFE circuitry processes a reconstructed signal to produce the second feedback signal;
　generate the hard estimate, via a hard limiter circuitry, corresponding to the summed signal;
　generate a second digital signal emulative of the optical signal based on the first digital signal and the second feedback signal; and
　equalize the second digital signal to compensate for at least one deficiency corresponding to the optical signal; and
employing a reconstruction circuitry to process the hard estimate to generate the reconstructed signal by:
　employing a precoding circuitry to process the hard estimate to generate a precoded signal; and
　employing a duobinary encoding circuitry, coupled to the precoding circuitry, to process the precoded signal to generate the reconstructed signal.

10. The method of claim 9, wherein:
the at least one deficiency corresponding to the optical signal is inter-symbol interference (ISI), dispersion, or non-linearity corresponding to or associated with at least one optical component of the optical communication channel.

11. The method of claim 9, wherein:
the method is performed within a communication device; and
the communication device is a transceiver or a receiver.

12. The apparatus of claim 1, wherein:
the apparatus being a communication device operative within a fiber-optic communication system and also operative within at least one of a satellite communication system, a wireless communication system, and a wired communication system.

13. The apparatus of claim 5, wherein:
the apparatus being a communication device operative within a fiber-optic communication system and also operative within at least one of a satellite communication system, a wireless communication system, and a wired communication system.

14. The method of claim 9, wherein:
the method is performed within a communication device that is operative within a fiber-optic communication system and also operative within at least one of a satellite communication system, a wireless communication system, and a wired communication system.

15. The method of claim 9, wherein:
the first DFE circuitry to compensate for inter-symbol interference (ISI) associated with the optical signal; and
the second DFE circuitry to compensate for a difference between a maximum value and a minimum value associated with the summed signal.

16. The apparatus of claim 1, wherein the apparatus comprises an optical duobinary (ODB) receiver communication device.

17. The apparatus of claim 1, wherein the first DFE circuitry and the second DFE circuitry are configured as a split DFE circuitry.

18. The apparatus of claim 1, wherein:
the apparatus includes a hard disk drive (HDD).

19. The apparatus of claim 5, wherein the apparatus comprises an optical duobinary (ODB) receiver communication device.

20. The apparatus of claim 5, wherein the first DFE circuitry and the second DFE circuitry are configured as a split DFE circuitry.

* * * * *